United States Patent
Park et al.

(10) Patent No.: US 9,476,513 B2
(45) Date of Patent: Oct. 25, 2016

(54) FUEL CELL COMPOUND VALVE FOR VEHICLE

(71) Applicant: HYUNDAI MOTOR COMPANY, Seoul (KR)

(72) Inventors: Jeong Hee Park, Suwon-si (KR); Myung Ju Ju Jung, Daejeon (KR); Chang Ha Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 50 days.

(21) Appl. No.: 14/553,667

(22) Filed: Nov. 25, 2014

(65) Prior Publication Data
US 2015/0337971 A1 Nov. 26, 2015

(30) Foreign Application Priority Data
May 21, 2014 (KR) .................. 10-2014-0060845

(51) Int. Cl.
| | |
|---|---|
| *F15B 13/04* | (2006.01) |
| *F16K 11/18* | (2006.01) |
| *F16K 31/524* | (2006.01) |
| *F01L 7/02* | (2006.01) |
| *F16D 1/108* | (2006.01) |
| *F16K 1/22* | (2006.01) |
| *F16K 11/16* | (2006.01) |
| *H01M 8/04* | (2016.01) |

(52) U.S. Cl.
CPC .................. *F16K 11/18* (2013.01); *F01L 7/02* (2013.01); *F16D 1/108* (2013.01); *F16K 1/223* (2013.01); *F16K 11/168* (2013.01); *F16K 31/52475* (2013.01); *H01M 8/04089* (2013.01); *Y02E 60/50* (2013.01); *Y10T 137/87056* (2015.04); *Y10T 137/87064* (2015.04)

(58) Field of Classification Search
CPC .. F16K 11/18; F16K 31/52475; F16K 1/223; F16K 11/168; F16D 1/108; H01M 8/04
USPC ............................................. 137/596, 596.17
See application file for complete search history.

(56) References Cited

U.S. PATENT DOCUMENTS

| | | | | |
|---|---|---|---|---|
| 1,096,482 | A * | 5/1914 | Winton ............... | B01F 3/04808 181/229 |
| 2,317,625 | A * | 4/1943 | Mallory .................. | F02M 1/00 123/432 |

(Continued)

FOREIGN PATENT DOCUMENTS

| | | |
|---|---|---|
| JP | 07-042578 A | 2/1995 |
| JP | 2011-066011 A | 3/2011 |

*Primary Examiner* — Craig Schneider
*Assistant Examiner* — Angelisa L Hicks
(74) *Attorney, Agent, or Firm* — McDermott Will & Emery LLP

(57) ABSTRACT

A fuel cell compound valve that opens and closes an inflow line and an exhaust line of a fuel cell stack for a hydrogen fuel cell vehicle includes a support frame having a first bore to which the exhaust line is connected and a second bore to which the inflow line is connected. A first rotation valve is configured to receive a driving torque of a motor installed in the support frame, rotate, and open and close the first bore. A second rotation valve is connected to the first rotation valve and is configured to open and close the second bore. A first coupler protrusion protrudes from a first shaft in a longitudinal direction and has at least one first flat surface perpendicular to the longitudinal direction. A second coupler protrusion protrudes from a second shaft in the longitudinal direction of the first shaft.

18 Claims, 13 Drawing Sheets

(56) References Cited

U.S. PATENT DOCUMENTS

| | | | |
|---|---|---|---|
| 5,036,816 A * | 8/1991 | Mann | F02D 11/107 123/336 |
| 6,349,925 B1 * | 2/2002 | Tobinai | F02M 17/00 261/23.3 |
| 2006/0086392 A1 * | 4/2006 | Nakayama | F02D 9/109 137/595 |

* cited by examiner

FUEL CELL COMPOUND VALVE FOR VEHICLE

CROSS-REFERENCE TO RELATED APPLICATION

This application claims priority to and the benefit of Korean Patent Application No. 10-2014-0060845 filed in the Korean Intellectual Property Office on May 21, 2014, the entire contents of which are incorporated herein by reference.

TECHNICAL FIELD

The present inventive concept relates to a fuel cell compound valve for a vehicle that can integrally form a valve that selectively opens and closes an air inflow line and an air exhaust line that are installed at the front end and the rear end of a fuel cell stack of a fuel cell vehicle.

BACKGROUND

In general, in an air supply system of a fuel cell vehicle, two valves exist.

One is an air cut-off valve that selectively cuts off air of the front end and the rear end of a fuel cell stack, which is a hydrogen chemical reaction apparatus of the fuel cell vehicle, upon turning on or off starting of the fuel cell vehicle. The other is a back pressure adjustment valve that is installed at the rear end of the fuel cell stack to adjust a back pressure are installed.

The air cut-off valve performs an on-off operation that closes and opens a valve bore that injects air, and the back pressure adjustment valve adjusts a back pressure by closing and opening a valve bore that exhausts air.

Such air cut-off and back pressure adjustment valves selectively operate by gear driving with a driving motor. However, the air cut-off valve and the back pressure adjustment valve are mounted in separate positions, one at the front end and one at the rear end of the fuel cell stack. Thus, installment of excessive related equipment is necessary, and the total cost may increase.

The above information disclosed in this Background section is only for enhancement of understanding of the background of the inventive concept and therefore it may contain information that does not form the prior art that is already known in this country to a person of ordinary skill in the art.

SUMMARY

The present inventive concept has been made in an effort to provide a fuel cell compound valve for a vehicle having advantages of being capable of reducing a cost by simplifying an equipment configuration by simplifying a valve configuration to be used in an air supply system of a fuel cell stack.

An exemplary embodiment of the present inventive concept provides a fuel cell compound valve that opens and closes an inflow line and an exhaust line of a fuel cell stack for a hydrogen fuel cell vehicle including a number of elements. A support frame has a first bore to which the exhaust line is connected and a second bore to which the inflow line is connected. A first rotation valve is configured to receive a driving torque of a driving motor installed in the support frame, rotate, and open and close the first bore. The first rotation valve has a first shaft. A second rotation valve is connected to the first rotation valve and is configured to open and close the second bore. The second rotation valve has a second shaft. A first coupler protrusion protrudes from the first shaft in a longitudinal direction. The first coupler protrusion has at least one first flat surface perpendicular to the longitudinal direction of the first shaft. The at least one first flat surface has a first area. A second coupler protrusion protrudes in a first coupler protrusion direction from the second shaft in the longitudinal direction of the first shaft. The second coupler protrusion has at least one second flat surface with an area smaller than that of the at least one first flat surface. The at least one second flat surface is configured to contact the at least one first flat surface.

in certain embodiments, the first coupler protrusion may have a cross-sectional area of a hemispherical shape.

in certain embodiments, the second coupler protrusion may have two second flat surfaces that selectively contact with the at least one first flat surface according to driving of the driving motor.

In certain embodiments, the two second flat surfaces may form a 90° angle.

In certain embodiments, the at least one first flat surface and any one of the two second flat surfaces may form 90°.

In certain embodiments, the first coupler protrusion may have a cross-sectional area of a fan shape and two first flat surfaces.

In certain embodiments, the second coupler protrusion may have a cross-sectional area of a fan shape and two second flat surfaces.

In certain embodiments, any one of the first flat surfaces and any one of the second flat surfaces may form a 45° angle.

In certain embodiments, the sum of angles between each first flat surface and the adjacent second flat surface may be 90°.

Another embodiment of the present inventive concept provides a fuel cell compound valve that opens and closes an inflow line and an exhaust line of a fuel cell stack for a hydrogen fuel cell vehicle. A support frame has a first bore to which the exhaust line is connected and a second bore to which the inflow line is connected. A first rotation valve is configured to receive a driving torque of a driving motor installed in the support frame, to rotate, and to open and close the first bore. The first rotation valve may have a first shaft. A second rotation valve is connected to the first rotation valve and is configured to open and close the second bore. The second rotation valve may have a second shaft. A first coupler protrusion protrudes from the first shaft in a longitudinal direction thereof and has at least one first flat surface perpendicular to the longitudinal direction. The at least one first flat surface has a first area. A second coupler protrusion protrudes in a first coupler protrusion direction from the second shaft in the longitudinal direction. The second coupler protrusion may have at least one second flat surface of an area smaller than that the first area. The at least one second flat surface is configured to contact the at least one first flat surface. A stopper is installed in the support frame and is configured to fixes a position of the second rotation valve.

The stopper may include a rotation body installed at an end of the second rotation valve. The rotation body may be configured to rotate together with the second rotation valve. A plurality of fixing holes may be disposed radially thereon relative to a center of rotation. An elastic spring may be installed in the support frame. A fixing protrusion may be installed in the elastic spring and may be configured to be selectively inserted into one of the fixing holes.

In another embodiment, the stopper may include a protrusion portion installed at an end surface of the second rotation valve. The protrusion portion may be configured to rotate together with the second rotation vaove. It may protrude to a side surface relative to a center of rotation. The protrusion portion may have a fixing hole disposed thereon. A solenoid stopper may have a stopper protrusion installed in the support frame. The stopper protrusion may be configured to move forward and backward and to be selectively inserted into the fixing hole.

According to an exemplary embodiment of the present inventive concept, a fuel cell compound valve of a vehicle having a compact configuration can be implemented with a configuration in which a first rotation valve that adjusts an air inflow amount of a fuel cell vehicle and a second rotation valve that adjusts a back pressure are together installed and thus a production cost can be reduced.

DETAILED DESCRIPTION OF THE EMBODIMENTS

Figure 1:
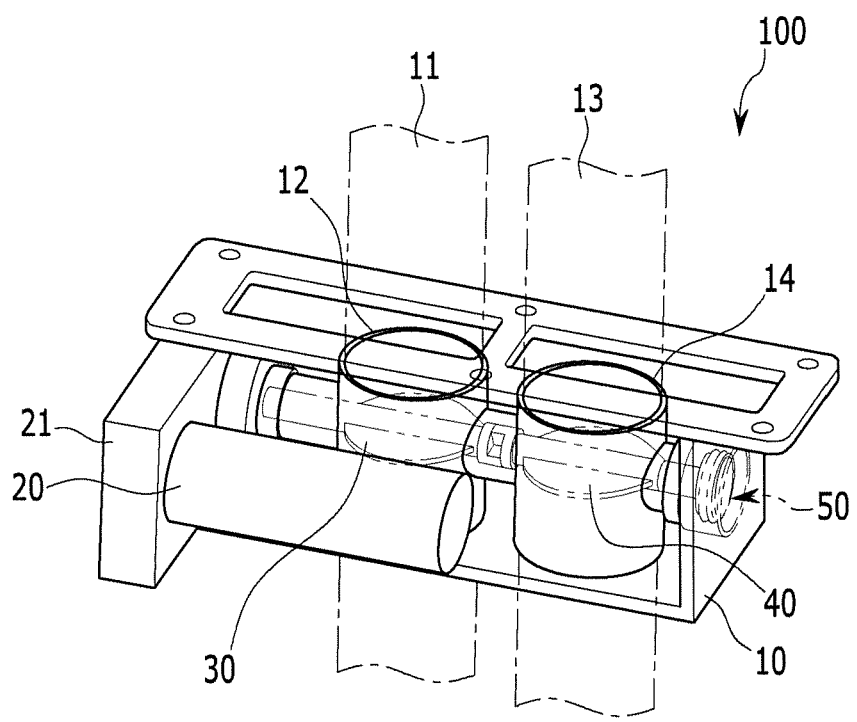
FIG. 1 is a perspective view illustrating a fuel cell compound valve of a vehicle according to an exemplary embodiment of the present inventive concept.

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept. The drawings and description are to be regarded as illustrative in nature and not restrictive. Like reference numerals designate like elements throughout the specification.

Figure 2:
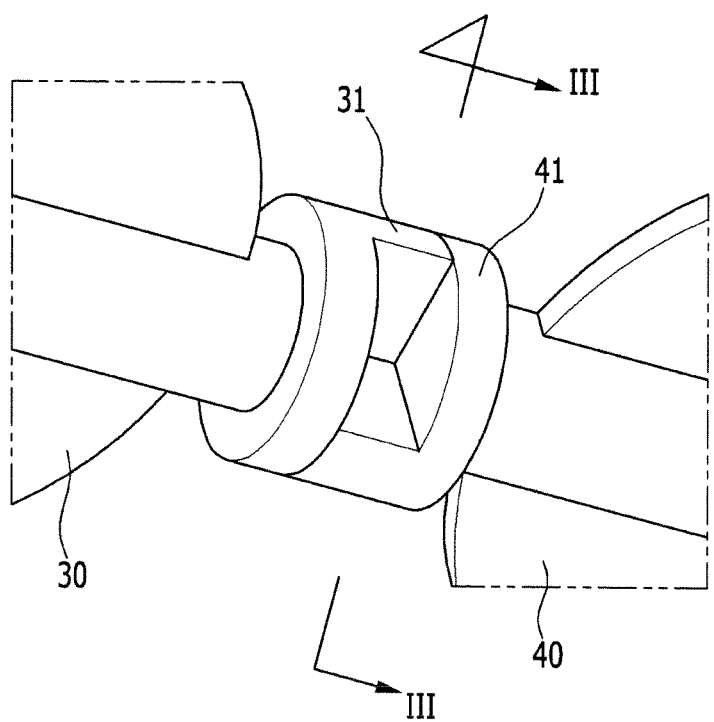
FIG. 2 is a partial perspective view illustrating a first coupler and a second coupler of the fuel cell compound valve of a vehicle of FIG. 1.
Figure 3:
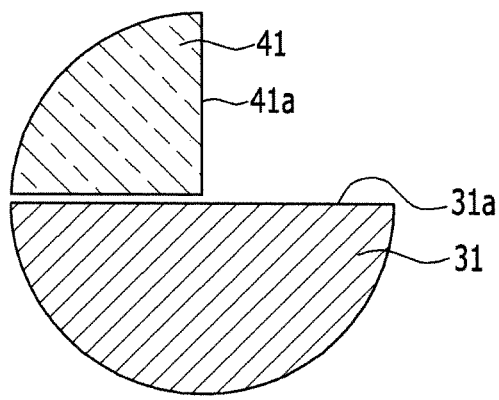
FIG. 3 is a cross-sectional view illustrating the first coupler protrusion and the second coupler protrusion taken along line III-III of FIG. 2.

FIG. 1 is a perspective view illustrating a fuel cell compound valve of a vehicle according to an exemplary embodiment of the present inventive concept, FIG. 2 is a partial perspective view illustrating a first coupler and a second coupler of a fuel cell compound valve of a vehicle of FIG. 1, and FIG. 3 is a cross-sectional view illustrating a first coupler and a second coupler taken along line III-III of FIG. 2.

As shown in FIGS. 1 and 2, a fuel cell compound valve 100 of a vehicle according to an exemplary embodiment of the present inventive concept relates to a compound valve that selectively opens and closes an inflow line 13 and an exhaust line 11 at the front end and the rear end of a fuel cell stack, which is a hydrogen chemical reaction apparatus for a hydrogen fuel cell vehicle.

The fuel cell compound valve 100 of such a vehicle includes a support frame 10 in which a first bore 12 and a second bore 14 are formed, a first rotation valve 30 that receives a driving torque of a driving motor 20 that is installed in the support frame 10 to rotate and that is installed to open and close the first bore 12, a second rotation valve 40 that is connected to the first rotation valve 30 and that is installed to open and close the second bore 14, and a first coupler protrusion 31 and second coupler protrusion 41 that are installed between the first rotation valve 30 and the second rotation valve 40.

The support frame 10 is installed in a location adjacent to a location in which a fuel cell stack (not shown) for the vehicle that is installed in the hydrogen fuel cell vehicle is installed. In the support frame 10, the first bore 12 and the second bore 14 are together installed.

The first bore 12 has a space that moves air therein to be connected to the exhaust line 11 of the fuel cell stack for the hydrogen fuel cell vehicle. The second bore 14 has a space that moves air therein to be connected to the inflow line 13 of the fuel cell stack for the hydrogen fuel cell vehicle.

At a side surface of such a support frame 10, the driving motor 20 is installed. The driving motor 20 rotates according to the control of a controller 21, transfers a driving torque to a driving shaft with gear tooth engagement driving of a drive gear (not shown) and a driven gear (not shown) to rotate the first rotation valve 30 and the second rotation valve 40 to be described later.

The first rotation valve 30 receives a driving torque of the driving motor 20 to be rotatably installed in the support frame 10 and may be installed to open and close the first bore 12. That is, the first rotation valve 30 is rotatably installed within the first bore 12 to selectively open and close the inside of the first bore 12 according to a rotated angle of the first rotation valve 30. In this way, by opening and closing the first bore 12 according to a rotation of the first rotation valve 30, an opening and closing operation of the exhaust line 11 may be performed. Therefore, the first rotation valve 30 can selectively control an air amount that is injected into a chemical reaction apparatus such as a fuel cell stack.

In the present exemplary embodiment, a rotation operation of the second rotation valve 40 may be interlocked with a rotation operation of the first rotation valve 30. For this reason, the first coupler protrusion 31 and the second coupler protrusion 41 are each installed between the first rotation valve 30 and the second rotation valve 40.

The first coupler protrusion 31 is protruded at a rotation center location of one side of the first rotation valve 30 within the support frame 10. In more detail, the first coupler protrusion 31 may have a cross-sectional area of a hemispherical shape. In this case, at one side of the first coupler protrusion 31, a first flat surface 31a may be formed. Such a first flat surface 31a contacts with a second flat surface 41a that is formed in a second coupler protrusion 41 and this will be described in detail hereinafter.

The second rotation valve 40 receives a driving torque of the driving motor 20 to be rotatably installed in the support frame 10 and may be installed to open and close the second bore 14. That is, the second rotation valve 40 is rotatably installed within the second bore 14 to selectively open and close the inside of the second bore 14 according to a rotated angle of the second rotation valve 40. In this way, by opening and closing the second bore 14 according to a rotation of the second rotation valve 40, an opening and closing operation of the inflow line 13 may be performed. Therefore, because an air amount to be exhausted to the outside of a chemical reaction apparatus such as a fuel cell stack can be selectively controlled, a back pressure can be adjusted.

In the second rotation valve 40, as the second coupler protrusion 41 is protruded, by interlocking with a rotation operation of the first rotation valve 30, a rotation operation may be performed.

The second coupler protrusion 41 may be protruded to one side at a rotation center location of the second rotation valve 40. In the present exemplary embodiment, the second coupler protrusion 41 has a fan shape and may be protruded to a side surface of the second rotation valve 40. At a side surface of such a second coupler protrusion 41, at an adjacent location, two second flat surfaces 41a are formed. Two second flat surfaces 41a that are formed in the second coupler protrusion 41 may form 90°. The second flat surface 41a of such a second coupler protrusion 41 may surface contact with the first flat surface 31a of the first coupler protrusion 31.

Hereinafter, a process of transferring a rotation driving torque of the first rotation valve 30 to the second rotation valve 40 by a surface contact of the first coupler protrusion 31 and the second coupler protrusion 41 will be described in detail.

The first flat surface 31a of the first coupler protrusion 31 contacts with the second flat surface 41a of the second coupler protrusion 41. Here, an empty space that forms 90° may be formed between the first flat surface 31a and the second flat surface 41a. That is, any one of two second flat surfaces 41a contacts with the first flat surface 31a, another one of the second flat surface 41a does not contact with the first flat surface 31a, and thus a rotation operation of the first rotation valve 30 is selectively transmitted to the second rotation valve 40 to selectively adjust an opening angle of the first bore 12 and the second bore 14.

Figure 4:
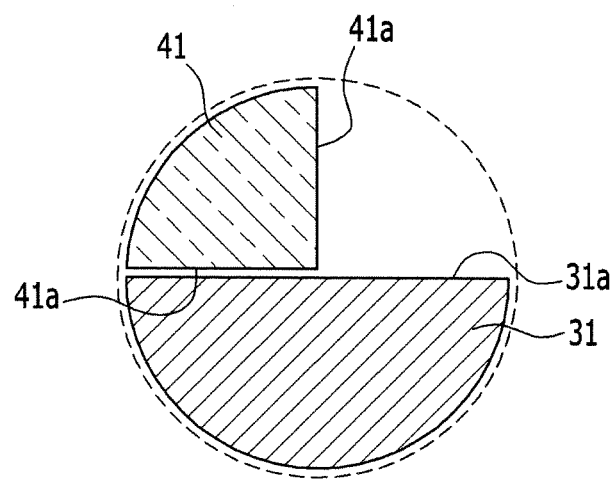
FIG. 4 is a diagram illustrating a surface contact state of a first coupler protrusion and a second coupler protrusion in a completely closed state of a first rotation valve and a completely closed and fixed state of a second rotation valve.

FIG. 4 is a diagram illustrating a surface contact state of a first coupler protrusion and a second coupler protrusion in a complete closed state of a first rotation valve and a complete closed and fixed state of a second rotation valve.

As shown in FIG. 4, in a non-driving state of the driving motor 20, in an initial state of the first coupler protrusion 31, the first rotation valve 30 is in a complete closed state, and in the second coupler protrusion 41, in a state in which one second flat surface 41a contacts with the first flat surface 31a, another second flat surface 41a and the first flat surface 31a form 90°. Here, the second rotation valve 40 is in a complete closed state that closes the second bore 14 according to a location of the second coupler protrusion 41.

Figure 5:
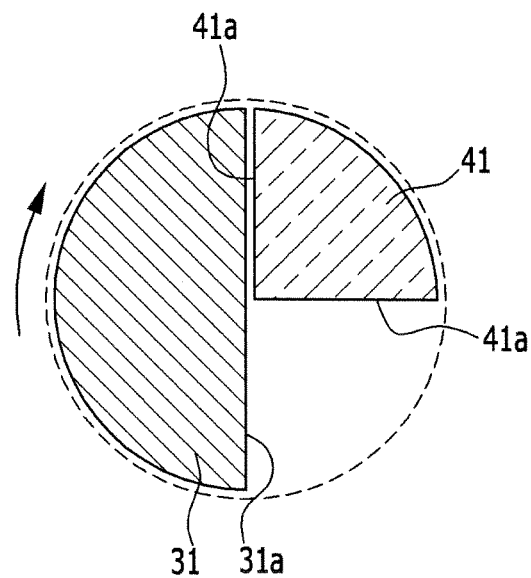
FIG. 5 is a diagram illustrating a state in which the first coupler protrusion and the second coupler protrusion of FIG. 4 are rotated by 90° clockwise.

FIG. 5 is a diagram illustrating a state in which the first coupler protrusion and the second coupler protrusion of FIG. 4 are rotated by 90° clockwise. As shown in FIG. 5, the first coupler protrusion 31 rotates by 90° clockwise to completely open the first bore 12. In a state in which the second coupler protrusion 41 surface contacts with the first coupler protrusion 31, the second coupler protrusion 41 and the first coupler protrusion 31 together rotate with by 90° clockwise to completely open the second bore 14.

Figure 6:
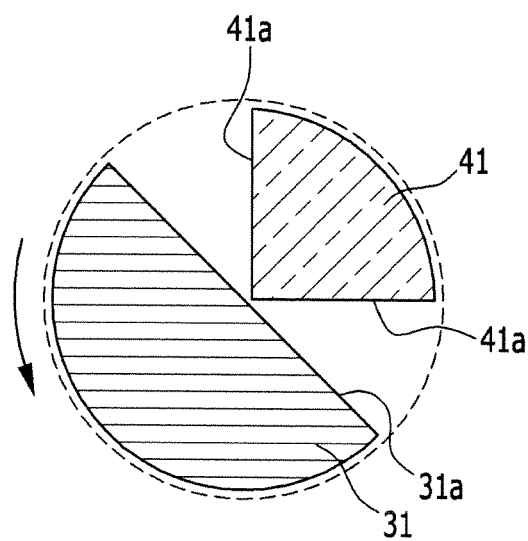
FIG. 6 is a diagram illustrating a state in which only the first coupler protrusion is rotated counterclockwise by a predetermined angle in a state in which the second coupler protrusion of FIG. 5 is stopped.

FIG. 6 is a diagram illustrating a state in which only a first coupler protrusion is rotated counterclockwise by a predetermined angle in a state in which the second coupler protrusion of FIG. 5 is stopped.

As shown in FIG. 6, the second rotation valve 40 completely opens the second bore 14 according to a location of the second coupler protrusion 41. As the first coupler protrusion 31 is located with rotated by a predetermined angle counterclockwise, the first rotation valve 30 may rotate in a state in which the first bore 12 is partially opened.

Figure 7:
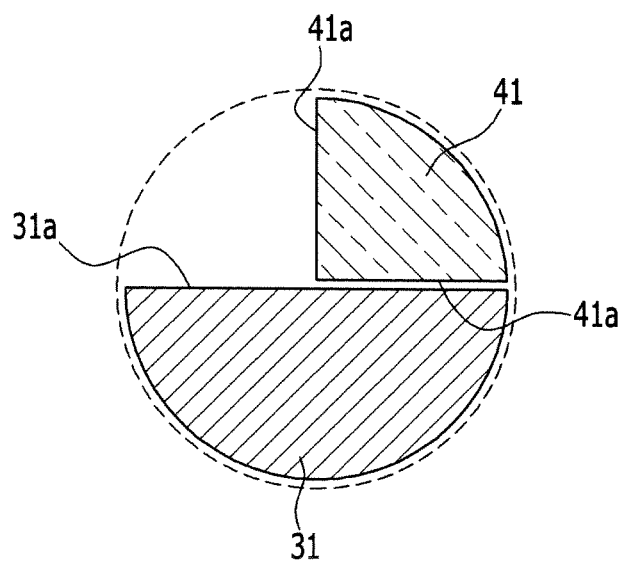
FIG. 7 is a diagram illustrating a state in which a first flat surface comes in surface contact with a second flat surface, as only the first coupler protrusion is further rotated counterclockwise in a state in which the second coupler protrusion of FIG. 6 is stopped.

FIG. 7 is a diagram illustrating a state in which a first flat surface comes in surface contact with a second flat surface, as only a first coupler protrusion is further rotated counterclockwise in a state in which the second coupler protrusion of FIG. 6 is stopped.

As shown in FIG. 7, in the second rotation valve 40, the second bore 14 is completely opened according to a location of the second coupler protrusion 41. As the first coupler protrusion 31 further rotates counterclockwise, the first flat surface 31a surface contacts with the second flat surface 41a, and thus the first rotation valve 30 rotates in a state that closes the first bore 12.

Figure 8:
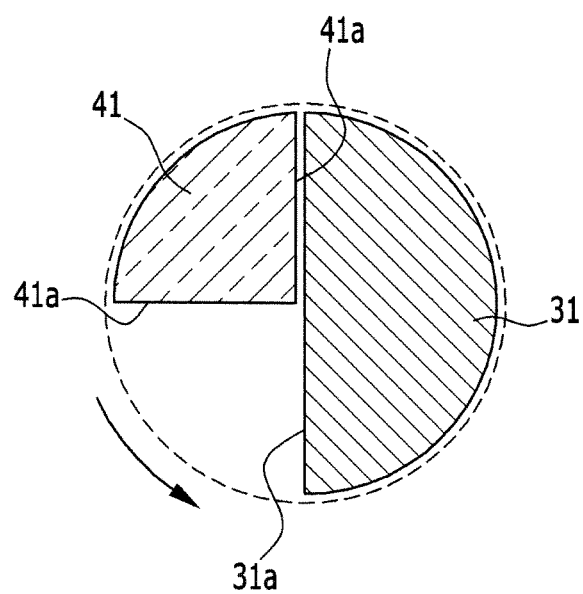
FIG. 8 is a diagram illustrating a state in which the first coupler protrusion and the second coupler protrusion of FIG. 7 are together rotated by 90° counterclockwise.

FIG. 8 is a diagram illustrating a state in which the first coupler protrusion and the second coupler protrusion of FIG. 7 are together rotated by 90° counterclockwise.

As shown in FIG. 8, the first rotation valve 30 completely opens the first bore 12, and the second rotation valve 40 completely closes the second bore 14.

Figure 9:
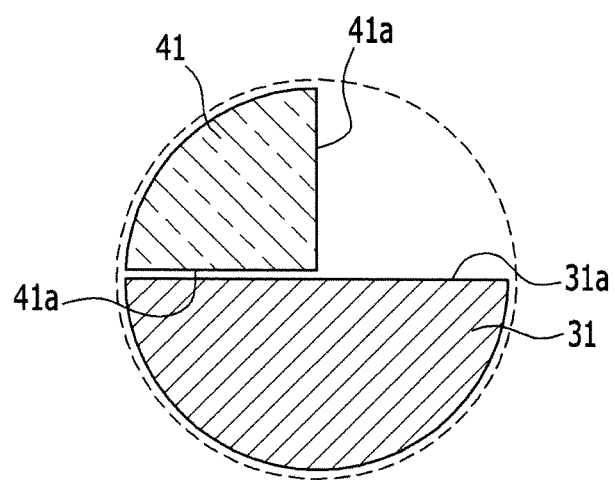
FIG. 9 is a diagram illustrating a state in which only the first coupler protrusion of FIG. 8 is rotated counterclockwise.

FIG. 9 is a diagram illustrating a state in which only the first coupler protrusion of FIG. 8 is rotated counterclockwise.

As shown in FIG. 9, the first rotation valve 30 closes the first bore 12, and the second rotation valve 40 closes the second bore 14.

As described above, in a fuel cell compound valve of a vehicle according to an exemplary embodiment of the present inventive concept, the first bore 12 that is connected to the exhaust line 11 and the second bore 14 that is connected to the inflow line 13 may be easily opened and closed by a rotation operation of the first rotation valve 30 and the second rotation valve 40. In this way, an opening and closing operation of the first bore 12 and the second bore 14 can be performed with a configuration in which the first rotation valve 30 and the second rotation valve 40 are together installed and thus a fuel cell compound valve of a vehicle having a compact configuration can be implemented and a production cost can thus be reduced.

In the support frame 10, a stopper 50 that fixes a rotated state of the second rotation valve 40 may be installed.

Figure 10:
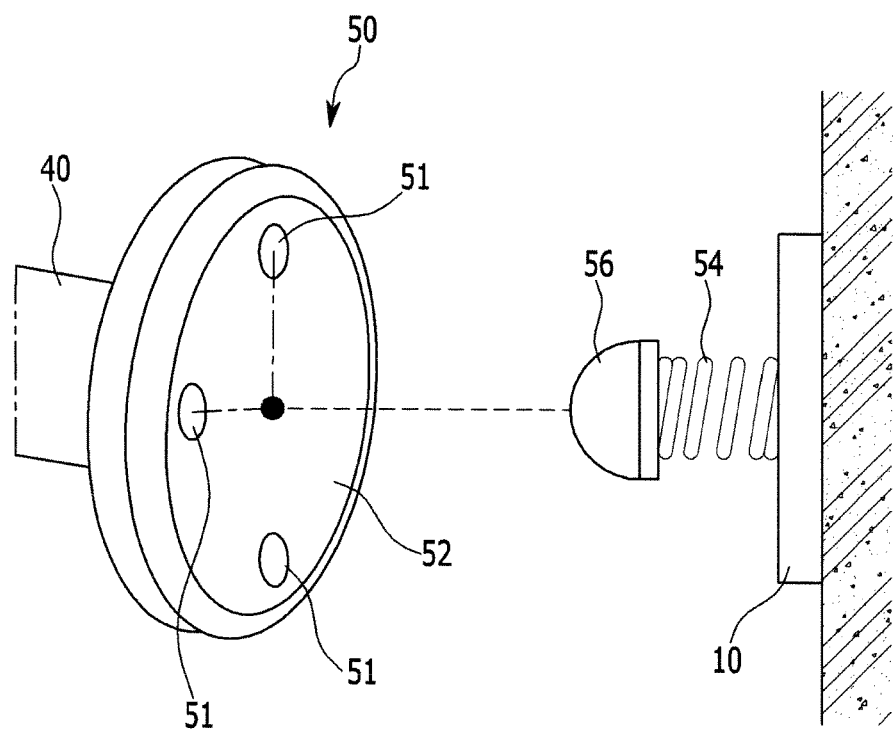
FIG. 10 is a diagram illustrating a state in which a stopper is installed between a support frame and a second rotation valve.

FIG. 10 is a diagram illustrating a state in which a stopper is installed between a support frame and a second rotation valve.

As shown in FIG. 10, the stopper 50 includes a rotation body 52 that is installed at an end surface of the second rotation valve 40 to together rotate with the second rotation valve, and in which a plurality of fixing holes 51 are radially formed based on a rotation center, an elastic spring 54 that is installed in the support frame 10, and a fixing protrusion 56 that is installed in the elastic spring 54 to be selectively installed into the fixing hole 51.

The rotation body 52 is integrally installed at a rotation center location of the second rotation valve 40, and a plurality of fixing holes 51 may be formed based on a rotation center. In the present exemplary embodiment, three fixing holes 51 are formed in the rotation body 52, but the number of the fixing hole 51 is not limited thereto and four or more fixing holes 51 may be formed.

The fixing protrusion 56 is installed by the elastic spring 54 in the support frame 10 and may be selectively inserted into the fixing hole 51 of the rotation body 52. Therefore, in a state in which the rotation body 52 is rotated, as the fixing protrusion 56 is inserted into the fixing hole 51, the first rotation valve 30 and the second rotation valve 40 may be fixed in a rotated state.

Figure 11:
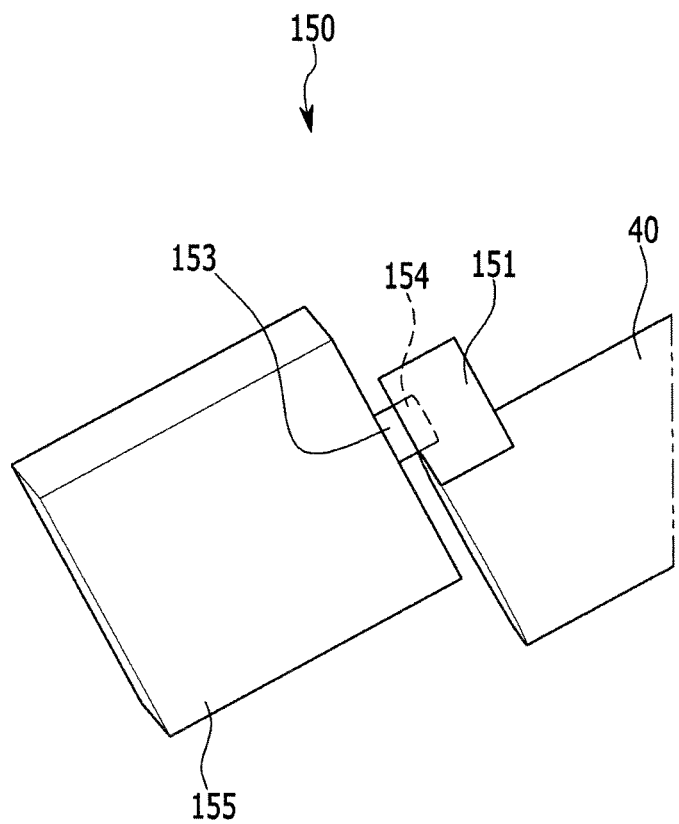
FIG. 11 is a diagram illustrating a stopper according to a second exemplary embodiment of the present inventive concept.

FIG. 11 is a diagram illustrating a stopper according to a second exemplary embodiment of the present inventive concept. The same reference numeral in FIGS. 1 to 10 indicates the same member of the same function. Hereinafter, a detailed description of the same reference numeral will be omitted.

As shown in FIG. 11, a stopper 150 according to a second exemplary embodiment of the present inventive concept includes a protrusion portion 151 that is installed at a side surface of the second rotation valve 40 to together rotate with the second rotation valve 40 and protrudes to a side surface based on a rotation center and that has a fixing hole 154 and a solenoid stopper 155 that has a stopper protrusion 153 that is installed in the support frame 10 to move forward and backward to be selectively inserted into the fixing hole 154.

Therefore, the stopper protrusion 153 moves forward and backward with operation of the solenoid stopper 155 to be selectively inserted into the fixing hole and thus the first rotation valve 30 and the second rotation valve 40 may be fixed in a rotated state.

Figure 12:
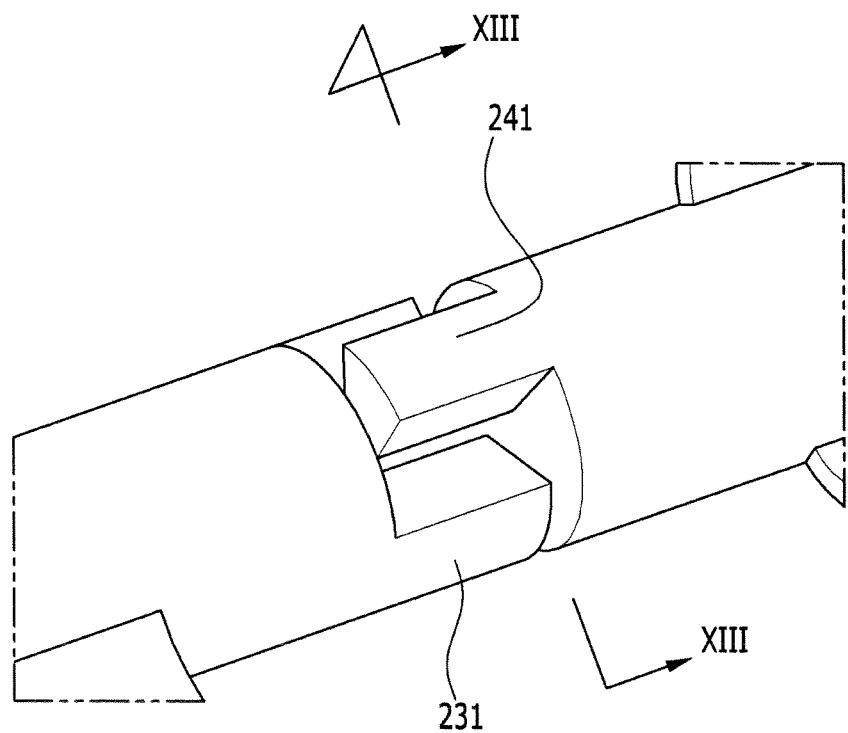
FIG. 12 is a partial perspective view illustrating a state in which a first coupler protrusion and a second coupler protrusion are connected according to a third exemplary embodiment of the present inventive concept.
Figure 13:
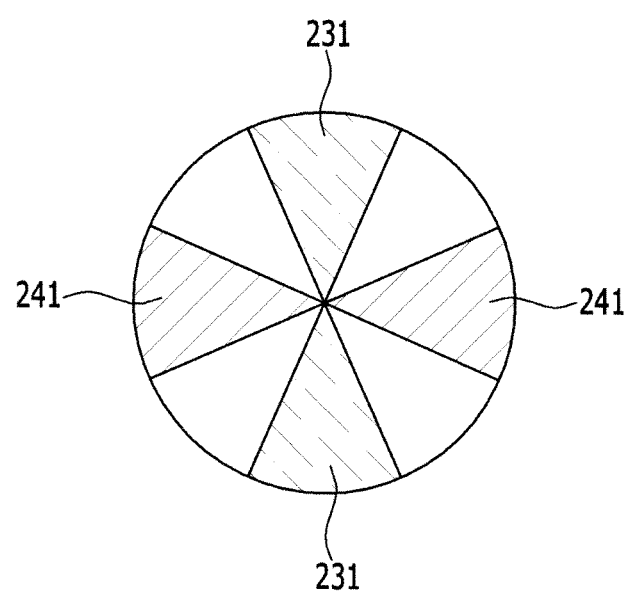
FIG. 13 is a cross-sectional view illustrating the first coupler protrusion and the second coupler protrusion taken along line XIII-XIII of FIG. 12.

FIG. 12 is a partial perspective view illustrating a state in which a first coupler protrusion and a second coupler protrusion are connected according to a third exemplary embodiment of the present inventive concept, and FIG. 13 is a cross-sectional view illustrating the first coupler protrusion and the second coupler protrusion taken along line XIII-XIII of FIG. 12. The same reference numeral in FIGS. 1 to 11 indicates the same member of the same function. Hereinafter, a detailed description of the same reference numeral will be omitted.

As shown in FIGS. 12 and 13, a first coupler protrusion 231 according to a third exemplary embodiment of the present inventive concept has a to cross-sectional area of a fan shape, has two first flat surfaces at a side surface thereof, and is protruded to the first rotation valve 30.

A second coupler protrusion 241 has a cross-sectional area of a fan shape, has two second flat surfaces at a side surface thereof, and is protruded to the second rotation valve 40.

In this way, as a clearance angle, which is an empty space is formed between the first coupler protrusion 231 and the second coupler protrusion 241, the first rotation valve 30 and the second rotation valve 40 may together perform a relative rotation and a simultaneous rotation. This corresponds to a rotation operation of the first rotation valve 30 and the second rotation valve 40 of the first exemplary embodiment described hereinabove. In certain embodiments, the clearance angle may be 45°. In the foregoing description, an exemplary embodiment of the present inventive concept has been described with reference to the drawings.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A fuel cell compound valve that opens and closes an inflow line and an exhaust line of a fuel cell stack for a hydrogen fuel cell vehicle, the fuel cell compound valve comprising:
   a support frame having a first bore to which the exhaust line is connected and a second bore to which the inflow line is connected;
   a first rotation valve configured to receive a driving torque of a driving motor installed in the support frame to open and close the first bore, the first rotation valve having a first shaft;
   a second rotation valve connected to the first rotation valve and configured to open and close the second bore, the second rotation valve having a second shaft;
   a first coupler protrusion protruding from the first shaft in a longitudinal direction thereof and having at least one first flat surface perpendicular to the longitudinal direction, the at least one first flat surface having a first area;
   a second coupler protrusion protruding in a first coupler protrusion direction from the second shaft in the longitudinal direction of the first shaft and having at least one second flat surface with a second area smaller than the first area, the at least one second flat surface contacting the at least one first flat surface; and
   a stopper installed in the support frame and configured to fix a position of the second rotation valve,
   wherein the stopper comprises:
   a rotation body installed at an end of the second rotation valve and configured to rotate together with the second rotation valve, the rotation body having a plurality of fixing holes disposed radially thereon relative to a center of rotation;
   an elastic spring installed in the support frame; and
   a fixing protrusion installed in the elastic spring, the fixing protrusion configured to be selectively inserted into one of the plurality of fixing holes.

2. The fuel cell compound valve of claim 1, wherein the first coupler protrusion has a cross-sectional area of a hemispherical shape.

3. The fuel cell compound valve of claim 2, wherein the second coupler protrusion has two second flat surfaces that selectively contact with the at least one first flat surface according to driving of the driving motor.

4. The fuel cell compound valve of claim 3, wherein the two second flat surfaces form a 90° angle.

5. The fuel cell compound valve of claim 3, wherein the at least one first flat surface and any one of the two second flat surfaces form 90°.

6. The fuel cell compound valve of claim 1, wherein the first coupler protrusion has a cross-sectional area of a fan shape and two first flat surfaces.

7. The fuel cell compound valve of claim 6, wherein the second coupler protrusion has a cross-sectional area of a fan shape and two second flat surfaces.

8. The fuel cell compound valve of claim 7, wherein any one of the two first flat surfaces and any one of the two second flat surfaces form a 45° angle.

9. The fuel cell compound valve of claim 8, wherein the sum of angles between each first flat surface and the adjacent second flat surface is 90°.

10. A fuel cell compound valve that opens and closes an inflow line and an exhaust line of a fuel cell stack for a hydrogen fuel cell vehicle, the fuel cell compound valve comprising:
- a support frame having a first bore to which the exhaust line is connected and a second bore to which the inflow line is connected;
- a first rotation valve configured to receive a driving torque of a driving motor installed in the support frame to open and close the first bore, the first rotation valve having a first shaft;
- a second rotation valve connected to the first rotation valve and configured to open and close the second bore, the second rotation valve having a second shaft;
- a first coupler protrusion protruding from the first shaft in a longitudinal direction thereof and having at least one first flat surface perpendicular to the longitudinal direction, the at least one first flat surface having a first area;
- a second coupler protrusion protruding in a first coupler protrusion direction from the second shaft and having at least one second flat surface with a second area smaller than the first area, the at least one second flat surface contacting the at least one first flat surface; and
- a stopper installed in the support frame and configured to fix a position of the second rotation valve,
wherein the stopper comprises:
- a protrusion portion installed at an end surface of the second rotation valve, configured to rotate together with the second rotation valve, and protruding to a side surface relative to a center of rotation, the protrusion portion having a fixing hole disposed thereon; and
- a solenoid stopper having a stopper protrusion installed in the support frame, the stopper protrusion configured to move forward and backward and to be selectively inserted into the fixing hole.

11. The fuel cell compound valve of claim 10, wherein the first coupler protrusion has a cross-sectional area of a hemispherical shape.

12. The fuel cell compound valve of claim 11, wherein the second coupler protrusion has two second flat surfaces that selectively contact with the first flat surface according to driving of the driving motor.

13. The fuel cell compound valve of claim 12, wherein the two second flat surfaces form 90°.

14. The fuel cell compound valve of claim 12, wherein the at least one first flat surface and any one of the two second flat surfaces form 90°.

15. The fuel cell compound valve of claim 10, wherein the first coupler protrusion has a cross-sectional area of a fan shape and has two first flat surfaces.

16. The fuel cell compound valve of claim 15, wherein the second coupler protrusion has a cross-sectional area of a fan shape and has two second flat surfaces.

17. The fuel cell compound valve of claim 16, wherein any one of the two first flat surfaces and any one of the two second flat surfaces form a 45° angle.

18. The fuel cell compound valve of claim 17, wherein the sum of angles between each first flat surface and the adjacent second flat surface is 90°.

* * * * *

UNITED STATES PATENT AND TRADEMARK OFFICE
CERTIFICATE OF CORRECTION

PATENT NO. : 9,476,513 B2  
APPLICATION NO. : 14/553667  
DATED : October 25, 2016  
INVENTOR(S) : Park et al.

Page 1 of 1

It is certified that error appears in the above-identified patent and that said Letters Patent is hereby corrected as shown below:

On the Title Page

Please change "(72) Inventors: Park; Jeong Hee (Suwon-si, KR), Jung; Myung Ju Ju (Daejeon, KR), Lee; Chang Ha (Yongin-si, KR)"

To read as follows:
-- (72) Inventors: Park; Jeong Hee (Suwon-si, KR), Jung; Myung Ju (Daejeon, KR), Lee; Chang Ha (Yongin-si, KR) --

Signed and Sealed this  
Sixteenth Day of May, 2017

Michelle K. Lee  
*Director of the United States Patent and Trademark Office*